UNITED STATES PATENT OFFICE.

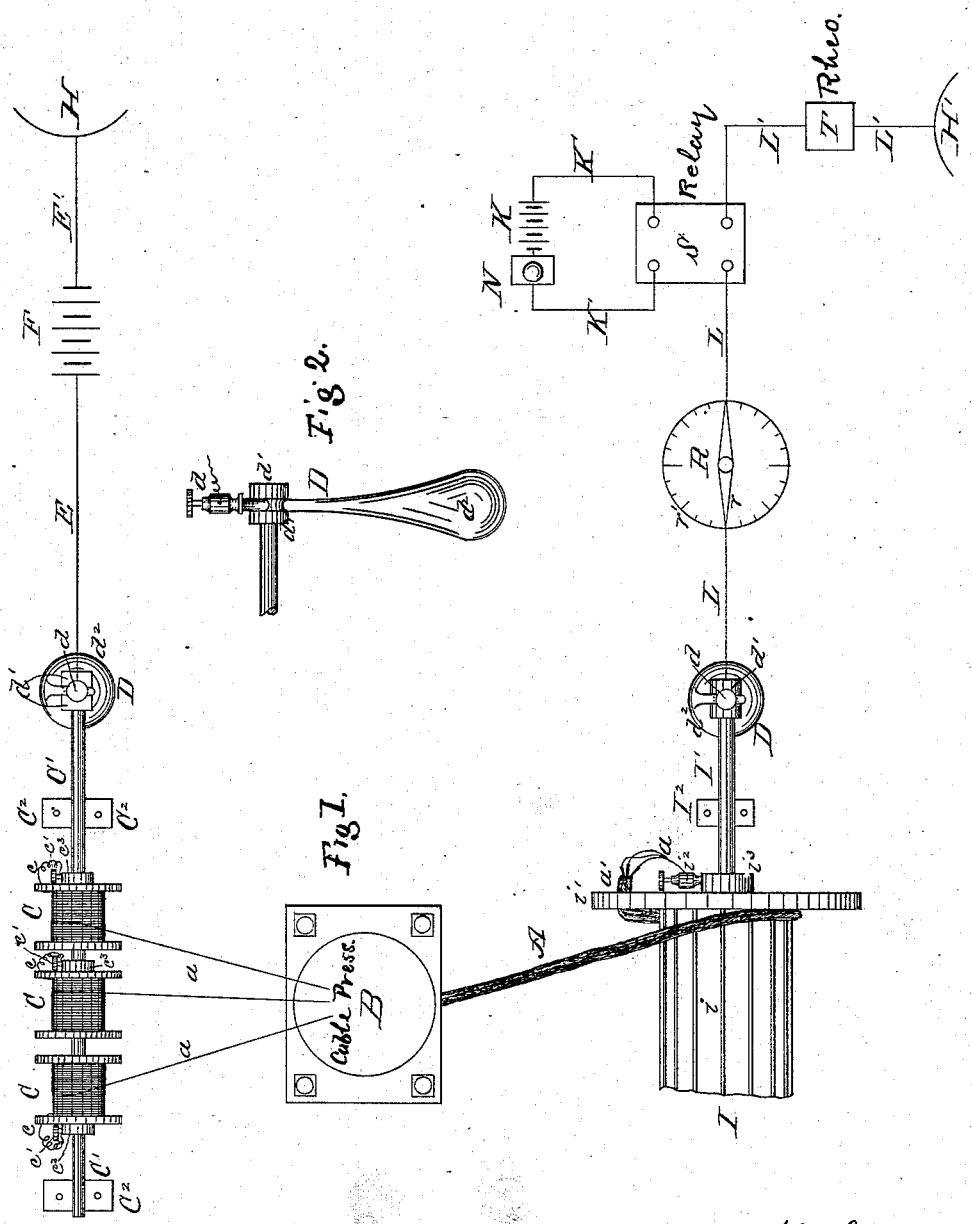

WILLIAM J. McELROY, OF PITTSBURG, PENNSYLVANIA, ASSIGNOR TO THE STANDARD CABLE COMPANY, OF NEW JERSEY.

ART OF TESTING ELECTRIC CABLES.

SPECIFICATION forming part of Letters Patent No. 284,138, dated August 28, 1883.

Application filed February 7, 1883. (No model.)

*To all whom it may concern:*

Be it known that I, WILLIAM J. McELROY, a citizen of the United States, residing at Pittsburg, county of Allegheny, State of Pennsylvania, have invented or discovered a new and useful Improvement in the Art of Testing Electric Cables; and I do hereby declare the following to be a full, clear, concise, and exact description thereof, reference being had to the accompanying drawings, making a part of this specification, in which—like letters indicating like parts—

Figure 1 illustrates by a general plan or diagram the combinations of circuits and mechanism employed in my invention, and Fig. 2 is a view in elevation of the device employed in making circuit-connection with the reel-shaft.

My present invention relates to the art of testing lead-covered electric cables during the operation of applying the lead to the wires; and in general terms it consists in passing a continuously-sustained current of electricity through the insulated wires as the lead is applied, and through a signaling device, the lead-applying mechanism being between the electric-current generator and the signal device, as hereinafter more fully described and claimed.

In the manufacture of lead-covered electric cables by means of a lead-press it is customary to apply the lead to the wires at comparatively high temperature—say about 300° Fahrenheit—the heat being of sufficient degree to melt the insulating compound with which the wires are coated. This element of heat is a source of more or less danger, and sometimes causes defects in the insulation of the wires, which it is desirable to detect and remove as soon as formed. In order to do this, it has been customary heretofore to connect a battery and galvanometer in circuit, having terminals in the insulated wires and in the lead covering, whereby on the occurrence of a fault in insulation the battery-circuit would be completed through the fault, and the galvanometer-needle would be moved, giving ocular signal of the defect. This kind of signal requires constant watching by an attendant in order to note the fault as soon as it occurs, and is therefore reliable for accurate location of a fault only in so far as such attendant is watchful and attentive. It is very desirable, in order to eliminate this element of uncertainty, that provision be made for giving automatically such audible or other signal on the occurrence of a fault that the workman shall be warned without reliance upon the watchfulness of any one person. A difficulty has been encountered in attempts made heretofore to do this by use of an ordinary relay and local bell-ringing circuit, the relay being connected in the normally-open signal-circuit before described. In such attempts it has been found that soon after the cable begins to come from the press the relay would close the bell-circuit, apparently indicating a fault; but on stopping the press the relay would react and the bell-circuit be opened, indicating no current in the main signal-circuit, and therefore that the cable was all right. On starting the press again the same disturbance would appear, and so persistently that attempts to use such relay and bell-circuit were unsuccessful. I have discovered that this disturbing element arises from an electric current generated or excited in the cable-wires by the application of the hot lead, and from its behavior, its characteristics and variableness with the temperature of the lead covering, and with the action of the press, I believe it to be a thermal current arising from unequal molecular tension caused by heat. It may be due, however, to "static induction," so called, produced or induced in some way by friction or otherwise in applying the lead to the wires, or it may be due in part, perhaps, to a direct conversion of heat into electricity; but whatever may be the cause or source of this current or electrical state, I have observed that it varies directly with the temperature of the lead, and on account of this direct relationship and seeming dependence I am induced to call it a "thermal" current, without, however, intending thereby to designate with certainty its source or origin.

In another application for patent, filed January 22, 1883, I have described this thermal current, with provision for eliminating it as a disturbing element, and also for utilizing it for testing purposes, such provision being made by means of a superior current of opposite polarity passed through the helix of a signaling device and through a polarized relay, such circuit being normally open, with terminals in the insulated wires and in the lead covering of the cable. Such features of invention are not claimed herein, my present invention having reference to the use of a continuously-sustained current and an ordinary relay or equivalent signal.

In the drawings I have represented at B a lead-press, which may be of any suitable or known construction—such, for example, as are commonly employed in the art—adapted to receive the desired number of insulated wires $a$ through its tubular core and die, and apply the lead covering under pressure at the point of the core within the die, delivering the cable A complete and ready for use.

The wires $a$ may be carried to the press from previously-prepared reels C, made of dry wood or other suitable material, mounted on a metallic shaft, C', which latter is supported on bearings $C^2$, of wood or other suitable non-conductor of electricity, whereby the shaft is insulated from ground. In order to connect the wires electrically with the shaft, their inner ends are passed through a hole in the head of the reel, as at $c$, and secured in posts $c'$, which connect through collars $c^3$ with the shaft. Circuit is continued from the shaft by line E, which is secured in binding-post $d$ on the removable weighted hook D, (see Fig. 2,) which is hooked on the shaft between the two collars $d'$ $d'$. The weight $d^2$ of the hook holds it in upright position as the shaft is rotated, and also insures pressure contact between the two for good circuit-connection.

I do not claim herein this combination of devices for securing circuit-connection through the reel, as the same will be included in the subject-matter of a separate application for patent.

The line E connects with one pole of a battery, F, and a line, E', leads from the other pole of this battery to ground H. As the finished cable A is delivered from the press, it is wound on a storing-reel, I, formed of wooden barrel $i$ and heads $i'$, metallic shaft I', and wood or equivalent non-conducting bearings, $I^2$, whereby the lead covering of the cable is insulated from the shaft and the latter from ground. The battery-circuit is continued through the cable and shaft of the reel by passing the end $a'$ of the cable through a hole in the head $i'$, and connecting the denuded wires $a$ to the shaft by post $i^2$ and collar $i^3$. The line L is connected to the shaft by a weighted hook, D', made and operated substantially like the hook D, before described. The line L is carried by preference through the helix of a galvanometer, R, and through the coils of a plain relay, S, thence by line L', through a rheostat, T, to ground H'.

To the rear posts of relay S a local battery and circuit, K K', is connected with an electric bell, N, by preference a vibrating bell in such circuit.

The press B has ground-connection through its foundation; but so long as the insulation of the cable-wires remains perfect or intact it will not be included in the battery-circuit.

During the operation of making the cable, or of applying its lead covering in the press, a continuous or completed battery current or circuit is maintained through the entire length of cable-wires, and through the galvanometer and relay, the battery being on one side of the press and cable and the galvanometer and relay on the other. This sustained or continued current will hold the armature of the relay forward, and in order to secure open bell-circuit for such position of the armature the terminals of the bell-circuit are made in the armature and in its back stop. If a fault occurs in the insulation of the cable-wires, the battery-current will be short-circuited through the same and through the press, thereby closing the bell-circuit and giving the alarm. Ordinarily the fault which will short-circuit the battery-current will have a like effect upon the thermal current excited in the cable. Consequently it will not form a disturbing element in my present invention, the battery-current being made the stronger of the two. If battery be connected with polarity in the same direction as the thermal current, the strength of the two will be combined to close the relay and give the signal. If polarity be opposite, the effective force will be measured by the difference in the two currents, and the battery, being the stronger, will prevail. As a precaution, however, against the possibility of sufficient thermal current remaining in the relay-circuit to hold the relay closed after the battery has been short-circuited by a fault, I introduce the rheostat T, and by it adjust the resistance of the line, and also the retractile spring of the relay, above the greatest strength of thermal current developed in practice, so that if the latter be present it will not avail to hold the relay closed.

The galvanometer R may be of any suitable construction, many such being known in the art. It is not an essential element in carrying out my invention; but, in connection with the rheostat T, it will be useful to indicate degrees of temperature in the cable or in its lead covering. This may be done by adjusting the resistance of the line to such degree as to cause the needle $r$ to stand for full current at or about some one point, as $r'$. Then, as the current varies, the needle will be moved from such position. The battery-current being practically constant, such variations will be due to the thermal current. As before stated, this current varies with the temperature of the cable or of its lead covering. Consequently the movements of the needle due to such variations will be an indication of the temperature of the lead, and will enable the workmen to judge accurately whether or not they are running the lead too hot for safety.

I do not claim herein, broadly, the method of indicating temperature in the cable by passing the thermal current through the helix of an electric signaling device, the same being included in the subject-matter of the prior application above referred to.

Instead of the ground-connections H H', the line E' may be connected directly with the line L', with a branch leading to the press, or to the lead covering of the cable.

It will be within my invention to employ other than an audible signal, as a drop or other plainly-movable signal—such, for example, as is commonly employed in electric signals for railways—and the helix for controlling such signal may be connected either in the completed or primary battery-circuit, or in the circuit formed by the fault, a constant or continuously-sustained battery-current being employed in either case, however, and the signal and battery being on opposite sides of the press, or, rather, the press being in circuit between the signal and battery; also, instead of the battery, any suitable or known electric generator may be employed, and in place of lead other soft ductile metal or alloy capable of being applied to the wires by the press may be used, and such modifications I consider as coming within my invention.

I claim herein as my invention—

1. In combination with a cable-press and cable, a battery having completed circuit through the insulated wires of the cable, and a normally-opened circuit through such wires and the press, and an electric signal connected in the battery-circuit, substantially as set forth.

2. In combination with a cable-press and cable, a battery having completed circuit through the insulated wires of the cable, and a normally-opened circuit through the press, a relay connected in the battery-circuit, and an electric bell and bell-circuit, the latter being opened and closed by the relay, substantially as and for the purposes set forth.

3. In combination with a cable-press and cable, a battery having completed circuit through the insulated wires of the cable, a relay and rheostat connected in such circuit, and a bell and bell-circuit connected with the relay, the rheostat and relay being adjusted above the strength of the thermal current excited in the cable, substantially as set forth.

4. In combination with a cable-press and cable, a battery having completed circuit through the insulated wires of the cable, a galvanometer, and a rheostat connected in such circuit, the rheostat being adjusted with reference to the battery and thermal currents, substantially as and for the purposes described.

In testimony whereof I have hereunto set my hand.

WILLIAM J. McELROY.

Witnesses:
R. H. WHITTLESEY,
C. L. PARKER.